United States Patent
Hamano et al.

[11] Patent Number: 6,124,061
[45] Date of Patent: Sep. 26, 2000

[54] LITHIUM ION SECONDARY BATTERY

[75] Inventors: Kouji Hamano; Yasuhiro Yoshida; Hisashi Shiota; Shou Shiraga; Shigeru Aihara; Michio Murai; Takayuki Inuzuka, all of Tokyo, Japan

[73] Assignee: Mitsubishi Denki Kabushiki Kaisha, Tokyo, Japan

[21] Appl. No.: 08/984,185

[22] Filed: Dec. 3, 1997

[30] Foreign Application Priority Data

Dec. 4, 1996 [JP] Japan .................................. 8-324032

[51] Int. Cl.[7] .................................................. H01M 10/40
[52] U.S. Cl. .......................... 429/316; 429/338; 429/326
[58] Field of Search .................................. 429/338, 316, 429/306, 326

[56] References Cited

U.S. PATENT DOCUMENTS 5,512,389 4/1996 Dasgupta et al. .
5,741,609 4/1998 Chen et al. .

*Primary Examiner*—John S. Maples
*Attorney, Agent, or Firm*—Oblon, Spivak, McClelland, Maier & Neustadt, P.C.

[57] ABSTRACT

To obtain a lithium ion secondary battery having excellent charge and discharge characteristics in which electric connection between electrodes can be maintained without requiring a strong armor metal case, so that it can be made into thin forms having large energy density. A positive electrode 3 prepared by bonding a positive electrode active material layer 7 to a positive electrode collector 6, a negative electrode 5 prepared by bonding a negative electrode active material layer 9 to a negative electrode collector 10 and a separator 4 which is arranged between these two electrodes and keeps a lithium ion-containing electrolytic solution are closely adhered by bonding the positive electrode active material layer 7 and the negative electrode active material layer 9 to the separator 4 by a porous adhesive resin layer 11, and an electrolytic solution is kept in through holes 12 formed in the adhesive resin layer 11, which communicate the positive electrode active material layer 7 and the negative electrode active material layer 9 with the separator 4.

10 Claims, 4 Drawing Sheets

SEPARATOR MOVING DIRECTION

SEPARATOR MOVING DIRECTION

LITHIUM ION SECONDARY BATTERY

BACKGROUND OF THE INVENTION

1. Field of the Invention

This invention relates to a lithium ion secondary battery in which positive and negative electrodes face each other sandwiching a separator which keeps an electrolytic solution, more particularly to a battery structure in which electric connection between a positive electrode and a negative electrode (electrodes) and separator is improved so that it can be made into thin form and the like optional forms and to a production method for the formation of said structure.

2. Description of the Related Art

There is a growing demand for the miniaturization and lightening of portable electronic instruments, and it is essential to improve performance of batteries to meet such a demand. Because of this, development and improvement of various batteries have been attempted in recent years with the aim of improving the battery performance. Expected characteristics of batteries to be improved include high voltage, large energy density, tolerance for large load resistance, optional shaping, safety and the like. Particularly, lithium ion battery is a secondary battery which can realize the highest voltage, largest energy density and tolerance for largest load resistance among existing batteries, and its improvement is still being made actively.

As its main composing elements, the lithium ion secondary battery has a positive electrode, a negative electrode and an ion conducting layer inserted between these electrodes. In the lithium ion secondary batteries which have been put into practical use, a plate-shaped material prepared by mixing powder of a lithium-cobalt oxide or the like active material with powder of an electron conducting substance and a binder resin and coating the mixture on an aluminum collector is used as the positive electrode, and another plate-shaped material prepared by mixing powder of a carbonaceous active material with a binder resin and coating the mixture on a copper collector is used as the negative electrode. Also, a porous film such as of polyethylene, polypropylene or the like filled with a lithium ion-containing non-aqueous solution is used as the ion conducting layer.

For example, FIG. 7 is a sectional view showing the structure of a prior art cylindrical lithium ion secondary battery disclosed in JP-A-8-83608 (the term "JP-A" as used herein means an "unexamined published Japanese patent application"). In FIG. 7, 1 is an armor case made of stainless steel or the like which also serves as a negative electrode terminal, 2 is an electrode body contained in the armor case 1, and the electrode body 2 has a structure in which a positive electrode 3, a separator 4 and a negative electrode 5 are coiled in a spiral shape. In order to maintain electric connection among the positive electrode 3, separator 4 and negative electrode 5, it is necessary to apply external pressure to surfaces of the electrode body 2. Because of this, contact among all surfaces is maintained by putting the electrode body 2 inserted into a strong metal case. In the case of a square battery, strips of electrode body are tied up into a bundle and put into a square metal case, thereby pressing them with external force.

As described in the foregoing, in the currently available lithium ion secondary batteries, strong armor cases made of metals and the like are used as a means to closely adhere positive and negative electrodes. Without the armor case, the electrodes are peeled off, so that it becomes difficult to maintain electric connection between the electrodes via an ion conducting layer (separator) and the battery characteristics therefore are deteriorated. On the other hand, not only the energy density of the battery itself is reduced because of the large weight and volume of the armor case occupying entire portion of the battery, but also shapes of the battery are limited due to rigidity of the armor case itself, thus causing a difficulty in making optional shapes.

In view of such backgrounds, development of a lithium ion secondary battery which does not require a strong armor case has been attempted with the aim of achieving lightening and thinning the battery. The point of the development of such a armor case-free battery is how to maintain electric connection of a positive electrode, a negative electrode and an ion conducting layer (separator) which is sandwiched by them, without applying external force. As such a connecting means which does not require external force, a method has been proposed in which the electrodes are closely adhered to the separator making use of a resin or the like.

For example, JP-A-5-159802 discloses a production method in which an ion conductive solid electrolyte layer and positive and negative electrodes are integrated into one body by their heat treatment using a thermoplastic resin binder. In this case, the electrodes are closely adhered to each other by integrating the electrodes and the electrolyte layer into one body, so that electric connection between the electrodes is maintained and the integrated body functions as a battery without applying external force.

Since the prior art lithium ion secondary batteries are constructed in the aforementioned manner, a battery which uses a strong armor case to ensure adhesiveness between electrodes and a separator and electric connection between electrodes is disadvantageous in producing a battery having large energy density, because the ratio of volume and weight of the non-electricity generating part armor case to the entire battery portion becomes large. Also, though a method in which electrodes are closely adhered to an ion conducting body via an adhesive resin has been proposed, it causes a problem in that ionic conduction resistance inside the battery cell increases and the battery characteristics are reduced due to large resistance of the adhesive resin layer, when a solid electrolyte layer is closely adhered to the electrodes simply via the adhesive resin.

In addition, in the case of the battery of JP-A-5-159802, the electrodes are bonded to a solid electrolytic layer with a binder, but since interfaces of the electrodes and the electrolytic layer are covered with the binder, it is disadvantageous in terms of ionic conductivity when compared for example with a case in which liquid electrolytes are used. Even if a binder having ionic conductivity is used, a material having an ionic conductivity equal to or larger than that of liquid electrolytes is not generally known, so that it causes a problem in that battery performance similar to that of a battery in which liquid electrolytes are used cannot be obtained easily.

SUMMARY OF THE INVENTION

The present invention has been accomplished as a result of intensive studies on the suitable bonding method of a separator and electrodes, conducted by the present inventors with the aim of resolving the aforementioned problems, and it contemplates providing a lithium ion secondary battery having excellent charge and discharge characteristics, which can closely adhere the electrodes to the separator without increasing ionic conduction resistance between the electrodes and without using a strong armor case, so that it has large energy density and can be made into a thin and optional shape.

A first aspect of the lithium ion secondary battery of the present invention is a battery which comprises a positive electrode having a positive electrode collector and a positive electrode active material layer formed on the positive electrode collector; a negative electrode having a negative electrode collector and a negative electrode active material layer formed on the negative electrode collector, a separator which is arranged between the positive electrode and negative electrode and keeps a lithium ion-containing electrolytic solution and a porous adhesive resin layer which bonds the positive electrode active material layer and the negative electrode active material layer to the separator and keeps the electrolytic solution to mutually connect the positive electrode, separator and negative electrode electrically.

A second aspect of the lithium ion secondary battery of the present invention is the battery according to the first aspect wherein hole ratio of the porous adhesive resin layer is equal to or larger than that of the separator.

A third aspect of the lithium ion secondary battery of the present invention is the battery according to the first aspect wherein hole ratio of the porous adhesive resin layer is more than 35%.

A fourth aspect of the lithium ion secondary battery of the present invention is the battery according to the first aspect wherein the ionic conduction resistivity of the adhesive resin layer in which the electrolytic solution is kept is set to a value equal to or lower than the ionic conduction resistivity of the separator in which the electrolytic solution is kept.

A fifth aspect of the lithium ion secondary battery of the present invention is the battery according to the first aspect wherein the bonding strength between the positive electrode active material layer and the separator is set to a value equal to or larger than the bonding strength between the positive electrode active material layer and the positive electrode collector, and the bonding strength between the negative electrode active material layer and the separator is set to a value equal to or larger than the bonding strength between the negative electrode active material layer and the negative electrode collector.

A sixth aspect of the lithium ion secondary battery of the present invention is the battery according to the first aspect wherein the adhesive resin layer is made of a fluoride resin or a mixture which uses a fluoride resin as the main component.

A seventh aspect of the lithium ion secondary battery of the present invention is the battery according to the sixth aspect wherein polyvinylidene fluoride is used as the fluoride resin.

An eighth aspect of the method of the present invention for fabricating a lithium ion secondary battery, is the method which comprises the steps of: preparing a positive electrode by forming a positive electrode active material layer on a positive electrode collector; preparing a negative electrode by forming a negative electrode active material layer on a negative electrode collector; preparing an adhesive resin solution, by dispersing a fluoride resin or a mixture containing a fluoride resin as the main component in N-methylpyrrolidone; coating the adhesive resin solution to at least one of the surface of the positive electrode active material layer and the facing surface of the separator and to at least one of the surface of the negative electrode active material layer and the facing surface of the separator; fitting the positive electrode active material layer and the negative electrode active material layer upon respective surfaces of the separator; evaporating the N-methylpyrrolidone from the adhesive resin solution to form porous adhesive resin layers so as to bond the positive electrode active material layer and the negative electrode active material layer upon respective surfaces of the separator to form a laminated body; and supplying a lithium ion-containing electrolytic solution to the laminated body.

A ninth aspect of the method of fabricating a lithium ion secondary battery according to the eighth aspect is the method wherein the adhesive resin solution contains 3–10 parts by weight of a fluoride resin or a mixture containing a fluoride resin as the main component in N-methylpyrrolidone.

A tenth aspect of the method of fabricating a lithium ion secondary battery according to the eighth aspect wherein the step of evaporating comprises a step of heating.

A eleventh aspect of the method of fabricating a lithium ion secondary battery according to the eighth aspect is the method wherein the step of coating comprises a step of coating by using a bar coator.

A twelfth aspect of the method of fabricating a lithium ion secondary battery according to the eighth aspect is the method wherein the step of coating comprises a step of coating by using a spray gun.

A thirteenth aspect of the method of fabricating a lithium ion secondary battery according to the eighth aspect is the method wherein the step of coating comprises a step of dipping the separator in an emulsified solution of the adhesive resin and then pulling it up.

In these drawings, 3 is a positive electrode, 4 is a separator, 5 is a negative electrode, 6 is a positive electrode collector, 7 is a positive electrode active material layer, 9 is a negative electrode active material layer, 10 is a negative electrode collector, 11 is an adhesive resin layer and 12 is through holes.

DESCRIPTION OF THE PREFERRED EMBODIMENT

Figure 1:
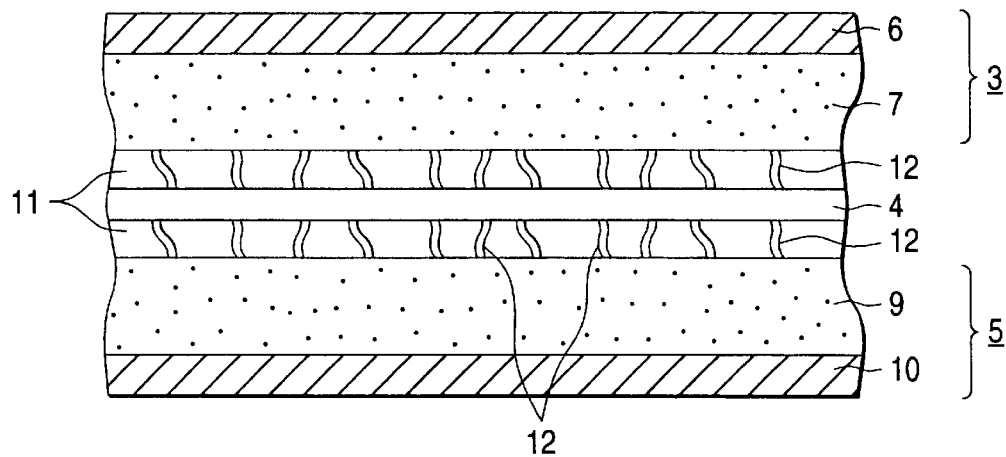
FIG. 1 is a sectional view showing the battery structure, or electrode laminate, of the lithium ion secondary battery of the first aspect of the present invention.

FIG. 1 is a sectional view showing battery structure, namely structure of the electrode laminate, of the lithium ion secondary battery of the first aspect of the present invention, in which 3 is a positive electrode prepared by bonding a positive electrode active material layer 7 to a positive electrode collector 6, 5 is a negative electrode prepared by bonding a negative electrode active material layer 9 to a negative electrode collector 10, 4 is a separator which is arranged between the positive electrode 3 and negative electrode 5 and keeps a lithium ion-containing electrolytic solution and 11 is a porous adhesive resin layer which bonds the positive electrode active material layer 7 and negative electrode active material layer 9 to the separator 4 and has a large number of through holes 12 that communicate the positive electrode active material layer 7 and negative electrode active material layer 9 with the separator 4.

Since the electrode layers (namely active material layers 7 and 9) and the separator 4 which becomes an electrolyte layer are mutually bonded by the porous adhesive resin layer 11, bonding strength between the electrodes and the separator is ensured and it becomes possible to prevent peeling between the electrodes and separator, which was difficult to achieve in the conventional batteries. Also, an electrolytic solution is kept in the through holes 12 which are formed in the inside part, namely in the adhesive resin layer 11, and communicate interfaces of the electrodes and separator, so that excellent ionic conductivity of the electrode-electrolyte interface can be ensured and ionic conduction resistance between the electrodes can be reduced. Coming and going quantity of ions in the active material layers inside the electrodes and drift speed and drift quantity of ions into facing electrodes can be controlled to the same levels of the prior art lithium ion batteries which use armor cases. Electric connection between the electrodes can be maintained without applying external force. In consequence, a strong armor case is not required for keeping the battery structure, so that lightening and thinning of the battery can be made, optional shapes can be formed and excellent charge and discharge characteristics and battery performance can be obtained which are similar to those of the conventional batteries that use an electrolytic solution.

Also, when the ionic conduction resistivity of the adhesive resin layer 11 in which the electrolytic solution is kept is set to a value equal to or lower than the ionic conduction resistivity of the separator 4 in which the electrolytic solution is kept, the adhesive resin layer 11 prevents deterioration of charge and discharge characteristics. The charge and discharge characteristics as a battery can be maintained at the level of prior art batteries.

The ionic conduction resistivity of the adhesive resin layer 11 can be adjusted mainly by changing its hole ratio and thickness. The hole ratio can be controlled for example by changing the ratio of an adhesive resin to N-methylpyrrolidone in an adhesive resin solution which forms the adhesive resin layer.

It is desirable also to set the bonding strength between the positive electrode active material layer and the separator to a value equal to or larger than the bonding strength between the positive electrode active material layer and the positive electrode collector, and the bonding strength between the negative electrode active material layer and the separator to a value equal to or larger than the bonding strength between the negative electrode active material layer and the negative electrode collector, namely to set the bonding strength to a value equal to or larger than the bonding strength of the adhered and integrated body of the active material layers and collectors inside the battery. A peeling test carried out after formation of a battery confirmed that, when bonding strength between the electrodes and the separator is sufficiently large, destruction of the electrodes (peeling of the active material layers from the collectors) occurs taking preference over peeling between the electrodes and the separator. This bonding strength can be controlled for example by changing thickness of the adhesive resin layer and selecting proper adhesive resin.

With regard to the adhesive resin to be used in the adhesive resin layer 11 for the adhesion of the active material layers to the separator, a resin which is insoluble in the electrolytic solution, does not generate electrochemical reactions in the battery and becomes porous membrane, namely a fluoride resin or a mixture which contains a fluoride resin as the main component, is used. Its illustrative examples include vinylidene fluoride, 4-ethylene fluoride and the like polymers which has fluorine atom in its molecular structure, or their mixtures with methyl polymethacrylate, polystyrene, polyethylene, polypropylene and the like. Of these resins, polyvinylidene fluoride as a fluoride resin is particularly desirable.

The lithium ion secondary battery constructed in the aforementioned manner is produced by adhering an adhesive resin solution, prepared by dispersing a fluoride resin or a mixture containing a fluoride resin as the main component in N-methylpyrrolidone, to both sides of the separator 4, thereby laminating the positive electrode active material layer 7 and negative electrode active material layer 9, and subsequently evaporating N-methylpyrrolidone to effect formation of the porous adhesive resin layer 11 which bonds the positive electrode active material layer 7 and the negative electrode active material layer 9 to the separator 4.

With regard to the active materials to be used in the present invention, examples of the material to be used in the positive electrode include complex oxides of lithium with cobalt, nickel, manganese and the like transition metals, chalcogen compounds or complex compounds thereof and these compounds which further contain various additional elements, and examples of the material to be used in the negative electrode include easy-graphitized carbon, hard-graphitized carbon, polyacene, polyacetylene and the like carbonaceous compounds and pyrene, perylene and the like scene structure-containing aromatic hydrocarbon compounds, but any other material may also be used with the proviso that it can occlude and release lithium ions which become the core of the battery actuation. In addition, these active materials are used in a granular form, and their useful particle size is 0.3 to 20 $\mu$m, most preferably 0.3 to 5 $\mu$m.

As the binder resin which is used for making the active materials into electrode plates, any resin can be used, provided that it is insoluble in the electrolytic solution and does not generate electrochemical reactions in the electrode laminate. Its illustrative examples include vinylidene fluoride, ethylene fluoride, acrylonitrile, ethylene oxide and the like homopolymers or copolymers and ethylene propylene diamine rubber.

Any metal which is stable in the battery can be used as the collector, but aluminum is preferably used in the positive electrode and copper in the negative electrode. With regard to the shape of the collector, foil, net, expanded metal and the like shapes can be employed, but net, expanded metal or the like shape having a large void area is desirable in terms of its feasibility to keep the electrolytic solution after bonding.

With regard to the adhesive resin to be for the adhesion of the collectors and electrodes, a resin which is insoluble in the electrolytic solution, does not generate electrochemical reactions in the battery and becomes porous membrane is used similar to the case of the adhesive resin which is used for the adhesion of the electrodes and separator. Its illustrative examples include vinylidene fluoride, 4-ethylene fluoride and the like polymers which has fluorine atom in its molecular structure, or their mixtures with methyl polymethacrylate, polystyrene, polyethylene, polypropylene and the like.

Also, any material can be used as the separator, with the proviso that it is electron insulating material having sufficient strength, such as a porous membrane, a net, non-woven fabric or the like. Though its construction material is not particularly limited, polyethylene or polypropylene is desirable from the viewpoint of adhesiveness and safety.

With regard to the solvent and electrolyte salt which are included in the electrolytic solution to be used as the ionic conduction body, non-aqueous solvents and lithium-containing electrolyte salts used in conventional batteries can be used. Illustrative examples of the solvent include dimethoxyethane, diethoxyethane, diethyl ether, dimethyl ether and the like ether solvents and propylene carbonate, ethylene carbonate, diethyl carbonate, dimethyl carbonate and the like ester solvents, which may be used as a single solution or as a mixture solution of two of the same or different solvents. Illustrative examples of the electrolyte salt to be used in the electrolytic solution include $LiPF_6$, $LiAsF_6$, $LiClO_4$, $LiBF_4$, $LiCF_3SO_3$, $LiN(CF_3SO_2)_2$, $LiC(CF_3SO_2)_3$, $LiN(C_2F_5SO_2)_2$ and the like.

In addition, a method in which a bar coater is used, a method in which a spray gun is used or a dipping process is used as a means for coating the adhesive resin.

Figure 2:
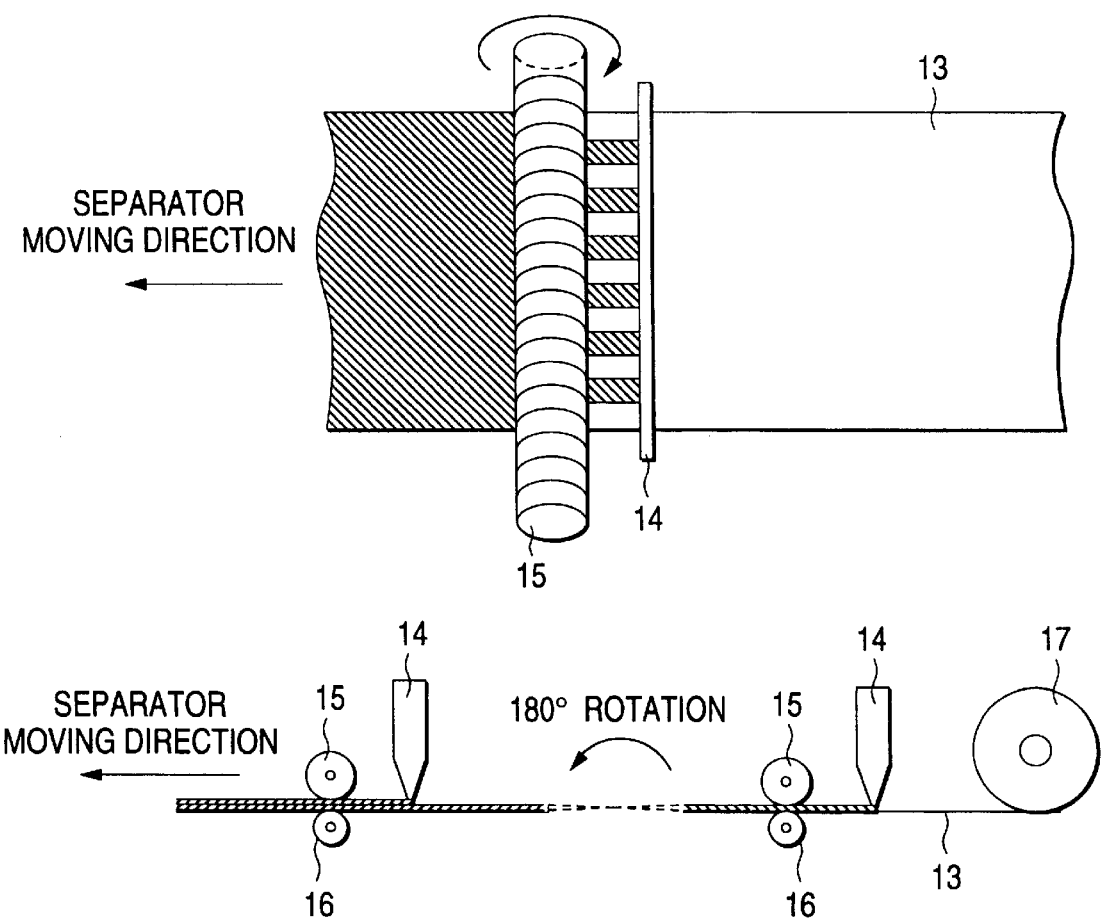
FIG. 2 is an explanation drawing showing a method for coating an adhesive resin solution by a bar coat method as a practical mode of the present invention.

For example, as shown in the explanation illustration of FIG. 2, the method in which a bar coater is used is carried out by adding dropwise an adhesive resin in lines to a separator material 13 which is moving, rolling the added resin with a bar coater 14, thereby effecting uniform coating of the adhesive resin on the entire area of one side of the separator material, and then, after coating of the side, the separator material is twisted at an angle of 180 degree (reversed) and the adhesive resin is coated on the un-coated side in the same manner. In this connection, 14 is an outlet for use in the dropwise addition of the adhesive resin, 16 is a backup roll and 17 is a separator roll.

Figure 4:
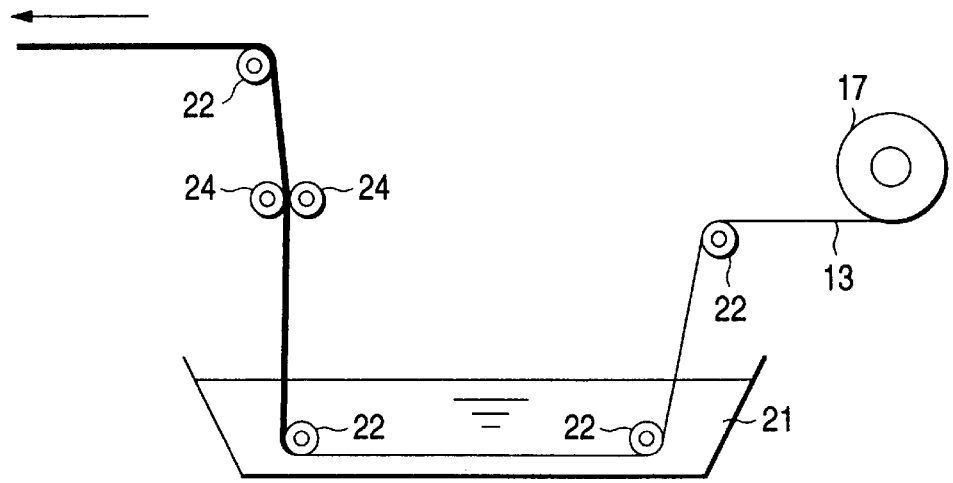
FIG. 4 is an explanation drawing showing a method for coating an adhesive resin solution by a dipping process as a practical mode of the present invention.

As shown in the explanation illustration of FIG. 4, in the method in which a spray gun is used, an adhesive resin solution or a liquid adhesive resin is packed in a spray gun 18 and then the adhesive resin solution or liquid adhesive resin is sprayed on the separator material 13, thereby effecting adhesion of the adhesive resin on the separator material 13. By arranging at least one spray gun 18 on each side of the separator material 13 and continuously spraying the adhesive resin solution while moving the separator material 13, the adhesive resin can be coated continuously on both sides of the separator. Similar to the case of the bar coater method, the adhesive resin can be coated on the separator within a short period of time and in a large amount.

Also, the dipping process is a coating method in which a separator is dipped in an emulsified solution of an adhesive resin and then pulled up, thereby effecting coating of the adhesive resin on both sides of the separator. That is, as shown in FIG. 4, entire part of the separator material 13 is dipped in an emulsified solution of adhesive resin (to be referred to as adhesive resin emulsion hereinafter) 21 and then pulled up while removing excess adhesive resin emulsion 21 by holding it between excess liquid removing rolls 24, thereby effecting coating of the adhesive resin on the whole sides of the separator. In the drawing, 22 is a backup roll. By the use of the dipping process, the coating step can be simplified and the adhesive resin can be coated within a short period of time and in a large amount.

Embodiments

Embodiments of the present invention are given below by way of illustration and not by way of limitation.

Embodiment 1

Firstly, preparation of a positive electrode is described.

A positive electrode active material paste prepared by dispersing 87 parts by weight of $LiCoO_2$, 8 parts by weight of graphite powder and 5 parts by weight of polyvinylidene fluoride in N-methylpyrrolidone was coated in a thickness of 300 $\mu$m by a doctor blade method to form an active material thin film. An aluminum net having a thickness of 30 $\mu$m to be used as a positive electrode collector was put on the film, on which was again coated the positive electrode active material paste prepared to a thickness of 300 $\mu$m by the doctor blade method. This was made into a half-dried state by allowing it to stand for 60 minutes in an oven of 60° C. The thus prepared laminate was closely adhered by lightly rolling it using a spin roller whose roll clearance has been adjusted to 550 $\mu$m, thereby preparing a positive electrode.

The thus prepared positive electrode was soaked in an electrolytic solution and then peel strength of the positive electrode active material layer and the positive electrode collector was measured to find a value of 20 to 25 gf/cm.

Next, preparation of a negative electrode is described.

A negative electrode active material paste prepared by dispersing 95 parts by weight of Meso Phase Microbeads Carbon (trade name: manufactured by Osaka Gas) and 5 parts by weight of polyvinylidene fluoride in N-methylpyrrolidone (to be referred to as NMP hereinafter) was coated in a thickness of 300 $\mu$m by the doctor blade method to form an active material thin film. A copper net having a thickness of 20 $\mu$m to be used as a negative electrode collector was put on the film, on which was again coated the negative electrode active material paste prepared to a thickness of 300 $\mu$m by the doctor blade method. This was made into a half-dried state by allowing it to stand for 60 minutes in an oven of 60° C. The thus prepared laminate was closely adhered by lightly rolling it using a spin roller whose roll clearance has been adjusted to 550 $\mu$m, thereby preparing a negative electrode.

The thus prepared negative electrode was soaked in an electrolytic solution and then peel strength of the negative electrode active material layer and the negative electrode collector was measured to find a value of 10 to 15 gf/cm.

The following describes preparation of an electrode laminate.

Firstly, a viscous adhesive resin solution was prepared by mixing 5 parts by weight of polyvinylidene fluoride with 95 parts by weight of N-methylpyrrolidone (to be referred to as NMP hereinafter) at that compositional ratio and thoroughly stirring the mixture until it became uniform solution.

Next, the thus prepared adhesive resin solution was coated on both sides of a separator material to be used as a separator, namely a porous polypropylene sheet (trade name Cell Guard #2400, manufactured by Hoechst).

Coating of the adhesive resin was carried out by the bar coater method.

A rolled-up separator material 13, namely a porous polypropylene sheet (trade name Cell Guard #2400, manufactured by Hoechst) having a width of 12 cm and a thickness of 25 $\mu$m, was took out and the adhesive resin solution was added dropwise to one side of the sheet in a line of orthogonal direction to the take out direction of the separator material. It was able to coat the adhesive resin solution thus applied in a line uniformly on whole sides of the separator material 13, by spinning a bar coater 15 prepared by minutely coiling a filament of 0.5 mm in diameter around a tube of 1 cm in diameter, while simultaneously moving the separator material 13. In this connection, coating mass of the adhesive resin can be controlled by changing amount of the adhesive resin solution to be added dropwise.

Thereafter, and before the adhesive resin solution was dried, the positive electrode and the negative electrode were closely adhered and laminated in such a way that they faced each other sandwiching the separator, and the thus pasted electrode laminate was allowed to stand for 2 hours in a hot air oven of 60° C. to effect evaporation of NMP, thereby preparing an electrode laminate. By the evaporation of NMP from the adhesive resin layer, it becomes a porous adhesive resin layer which has through holes that communicate the positive electrode and negative electrode with the separator.

Subsequently, an electrolytic solution prepared using ethylene carbonate and diethyl carbonate as the solvent and $LiPF_6$ as the solute was injected into the electrode laminate. When peel strengths of the positive electrode active material layer and the separator and of the negative electrode active material layer and the separator were measured at this stage, the strengths were found to be 25 to 30 gf/cm and 15 to 20 gf/cm, respectively. A lithium ion battery was completed by packing the thus electrolytic solution-injected electrode laminate with a resin laminated aluminum film (to be referred to as an aluminum laminate film hereinafter) and sealing the opening by hot melting.

Figure 5:
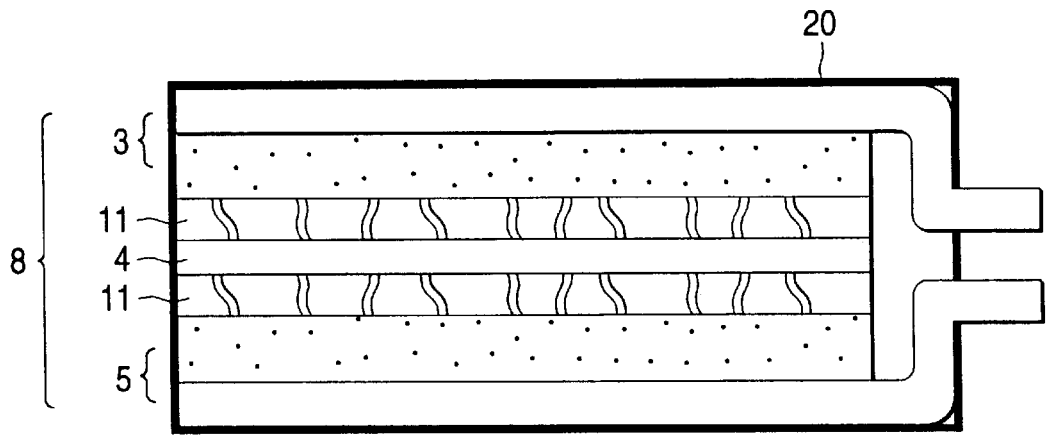
FIG. 5 is a sectional illustration showing the lithium ion secondary battery according to the first aspect of the present invention.

FIG. 5 is a sectional illustration showing the lithium ion secondary battery of the first practical mode 1 of this invention. In this drawing, 26 is an armor aluminum laminate pack and 8 is an electrode laminate sealed in the armor aluminum laminate pack. The electrode laminate 8 is composed of a positive electrode 3, a separator 4 and a negative electrode 5. An adhesive resin layer 11 is arranged between the positive electrode 3 and separator 4 and the negative electrode 5 and separator 4, thereby bonding the positive electrode 3 and negative electrode 5 to the separator 4 tightly. An electrolytic solution is kept in through holes 12 in the adhesive resin layer 11, holes in the electrode active material layers and holes in the separator.

As described above, in this lithium ion secondary battery, the positive electrode 3 and separator 4 and the negative electrode 5 and separator 4 are closely adhered by the adhesive resin layer 11, through holes 12 which communicate between the electrodes 3 and 5 and the separator 4 are formed in a large number in the adhesive resin layer 11 and an electrolytic solution is kept in the through holes 12 to ensure excellent ionic conductivity, so that it was able to produce a thin and light battery which has excellent charge and discharge characteristics and does not require external pressurization, namely which does not require a strong armor case.

Figure 6:
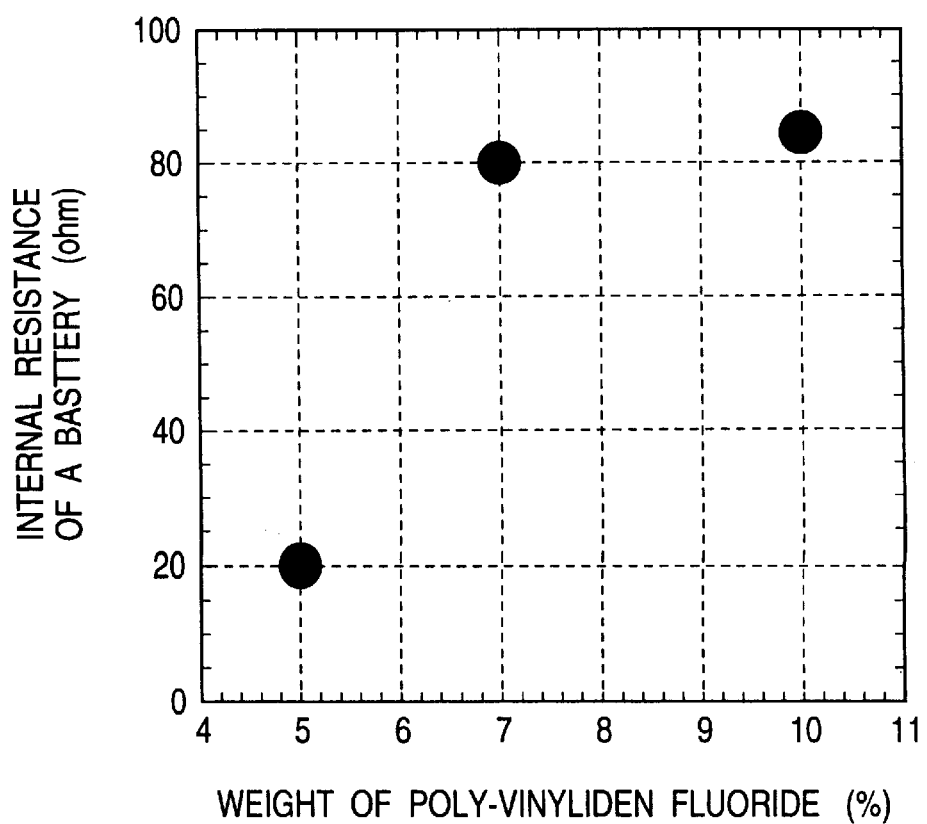
FIG. 6 is a characteristic drawing showing a relationship between the internal resistance and the amount of adhesive resin in the adhesive resin solution at the time of the formation of the adhesive resin layer according to the first aspect of the present invention.
Figure 7:
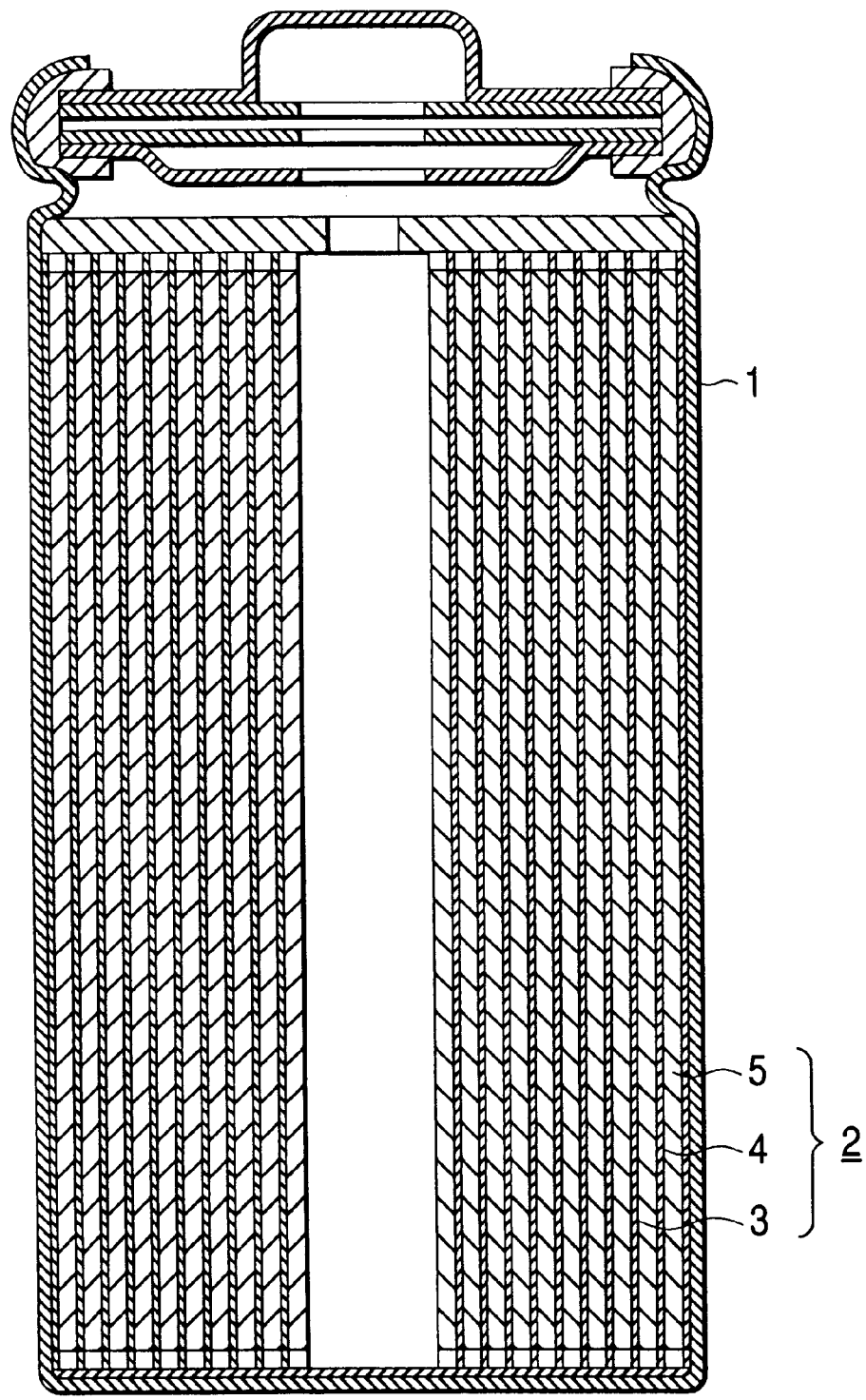
FIG. 7 is a sectional illustration showing an example of the prior art lithium ion secondary battery.

The characteristic graph of FIG. 6 shows internal resistance of a battery when an adhesive resin layer was formed by changing the amount of polyvinylidene fluoride resin as an adhesive resin in an adhesive resin solution to 5 parts by weight, 7 parts by weight or 10 parts by weight based on NMP. It can be seen that the resistance increases sharply between 5 parts by weight and 7 parts by weight. Since thickness of the adhesive resin layer 11 was proportional to the amount of adhesive layer in the adhesive resin solution, it was considered that the resistance increased rapidly in this range due to sudden changes in the retention of the electrolytic solution and distribution conditions of the electrolytic solution in the adhesive resin layer 11. In this connection, the resistance value in the case of 5 parts by weight was almost the same as the resistance value which was measured by not arranging the adhesive resin layer 11 but applying sufficient pressure to the surfaces between the electrodes 3 and 5 and the separator 4.

An adhesive resin solution preferably contains 3–10 parts by weight of a fluoride resin or a mixture containing a fluoride resin as the main component in N-methylpyrrolidone in the view of the ion conductivity and bonding strength of the adhesive layer. More preferably 4–6 parts by weight. And a thickness of the adhesive resin layer is preferably less than 0.5 μm. Not only polyvinylidene fluoride resin but also other adhesive resin can be used as an adhesive resin as same, and come to the same result.

Embodiment 2

In preparing the adhesive resin layer 11 shown in Embodiment 1, viscous adhesive resin solutions were prepared by mixing N-methylpyrrolidone with each of the following compounds 1–9 in stead of polyvinylidene fluoride at the same compositional ratio as Embodiment 1 respectively.

1. Polytetrafluoroethylene
2. Copolymer of vinylidene fluoride and acrylonitrile
3. Mixture of polyvinylidene fluoride and polyacrylonitrile
4. Mixture of polyvinylidene fluoride and polyethylene oxide
5. Mixture of polyvinylidene fluoride and polyethylene terephthalate
6. Mixture of polyvinylidene fluoride and methyl polymethacrylate
7. Mixture of polyvinylidene fluoride and polystyrene
8. Mixture of polyvinylidene fluoride and polypropylene
9. Mixture of polyvinylidene fluoride and polyethylene Using these adhesive resin solutions, the electrode laminate 8 was prepared by the same method of Embodiment 1. When peel strengths of the positive electrode active material layer and separator and of the negative electrode active material layer and separator in this electrode laminate 8 were measured, the strengths were converged at 25 to 70 gf/cm and 15 to 70 gf/cm, respectively. Thereafter, keeping of an electrolytic solution, packing of the battery with an aluminum laminate film and sealing of the opening were carried out in the same manner as described in Embodiment 1, thereby obtaining respective lithium ion secondary batteries. Similar to the case of Inventive Embodiment 1, thin and light batteries having excellent charge and discharge characteristics were obtained.

Though a case in which an adhesive resin solution is coated by a bar coater method was shown in the above embodiments, the adhesive resin solution may also be coated using a spray gun.

Figure 3:
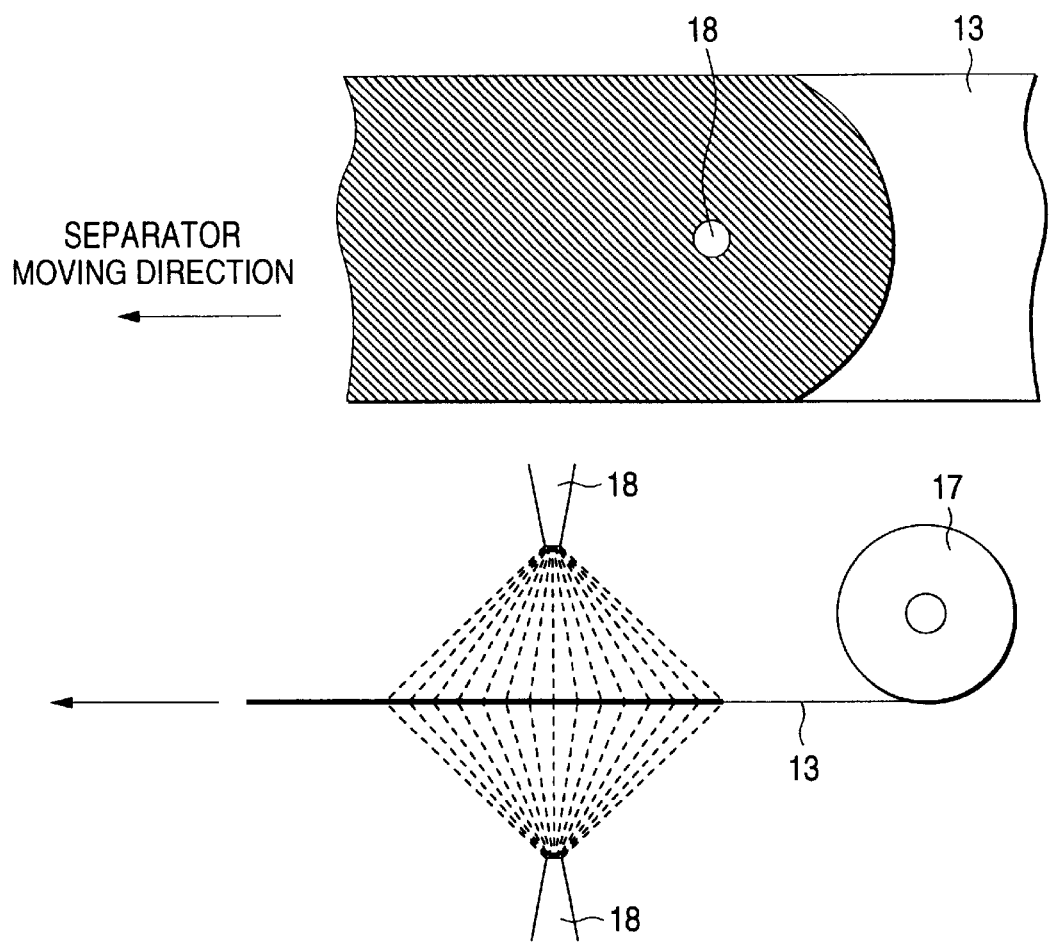
FIG. 3 is an explanation drawing showing a method for coating an adhesive resin solution using a spray gun as a practical mode of the present invention.

As shown in FIG. 3, a rolled-up separator material, namely a porous polypropylene sheet (trade name Cell Guard #2400, manufactured by Hoechst) having a width of 12 cm and a thickness of 25 μm, was took out and an adhesive resin solution was sprayed to the separator using a spray gun which has been packed with the adhesive resin solution. By the spraying, it was able to coat the adhesive resin solution uniformly on both sides of the separator material. Also, it was able to adjust coating mass of the adhesive resin solution by changing the splaying quantity.

Adhesion of the adhesive resin solution may also be effected by a dipping process.

A rolled-up separator material, namely a porous polypropylene sheet (trade name Cell Guard #2400, manufactured by Hoechst) having a width of 12 cm and a thickness of 25 μm, was took out and then dipped in a solution which has been prepared by mixing the adhesive resin solution shown in Embodiments 1 and 2 with hexane at a weight ratio of 1:1. This solution is in an emulsified state. Thereafter, when the separator material was put between excess liquid removing rolls to remove excess liquid and then air was blew against the separator to evaporate hexane, it was confirmed that the adhesive resin layer was uniformly adhered to both sides of the separator.

In the first aspect of the lithium ion secondary battery of the present invention, the battery is equipped a positive electrode prepared by bonding a positive electrode active material layer to a positive electrode collector, a negative electrode prepared by bonding a negative electrode active material layer to a negative electrode collector, a separator which is arranged between the positive electrode and negative electrode and keeps a lithium ion-containing electrolytic solution and a porous adhesive resin layer which bonds the positive electrode active material layer and the negative electrode active material layer to the separator and keeps the electrolytic solution to mutually connect the positive electrode, separator and negative electrode electrically, so that the electrodes can be adhered closely to the separator by the adhesive resin layer and proper ionic conductivity of the electrode-electrolyte interface can be secured by the electrolytic solution kept in the adhesive resin layer through holes which communicate between the electrodes and the separator, thus exerting an effect of being able to obtain a lithium ion secondary battery which has excellent charge and discharge characteristics, can be made into a thin form having large energy density and is able to be formed into optional shapes.

In the second aspect of the lithium ion secondary battery of the present invention, hole ratio of the porous adhesive resin layer is equal to or larger than that of the separator, so that both ionic conductivity of the electrode-electrolyte interface and bonding strength are kept more appropriately.

In the third aspect of the lithium ion secondary battery of the present invention, hole ratio of the porous adhesive resin layer is more than 35%, so that both ionic conductivity of the electrode-electrolyte interface and bonding strength are kept more appropriately.

In the fourth aspect of the lithium ion secondary battery of the present invention, the ionic conduction resistivity of the adhesive resin layer in which electrolytic solution is kept according to the first aspect is set to a value equal to or lower than the ionic conduction resistivity of the electrolytic solution-keeping separator, so that excellent charge and discharge characteristics can be maintained without deteriorating the charge and discharge characteristics.

In the fifth aspect of the lithium ion secondary battery of the present invention, in accordance with the first aspect, the bonding strength between the positive electrode active material layer and the separator is set to a value equal to or larger than the bonding strength between the positive electrode active material layer and the positive electrode collector, and the bonding strength between the negative electrode active material layer and the separator is set to a value equal to or larger than the bonding strength between the negative electrode active material layer and the negative electrode collector, so that destruction of the electrodes occurs taking preference over peeling between the electrodes and the separator. The electrodes can be adhered to the separator sufficiently strongly by the adhesive resin layer. Electric connection between the electrodes can be fully maintained.

In the sixth aspect of the lithium ion secondary battery of the present invention, a fluoride resin or a mixture which uses a fluoride resin as the main component is used as the adhesive resin layer in the first aspect, so that a lithium ion secondary battery having the aforementioned excellent characteristics can be obtained.

In the seventh aspect of the lithium ion secondary battery of the present invention, polyvinylidene fluoride is used as the fluoride resin of the fifth aspect, so that a lithium ion secondary battery having more excellent characteristics can be obtained.

In the method of the present invention for the production of a lithium ion secondary battery, an adhesive resin solution prepared by dispersing a fluoride resin or a mixture containing a fluoride resin as the main component in N-methylpyrrolidone is adhered to both sides of a separator which is arranged between a positive electrode prepared by bonding a positive electrode active material layer to a positive electrode collector and a negative electrode prepared by bonding a negative electrode active material layer to a negative electrode collector, thereby laminating the positive electrode active material layer and negative electrode active material layer, and then the N-methylpyrrolidone is evaporated to effect formation of a porous adhesive resin layer which bonds the positive electrode active material layer and the negative electrode active material layer to the separator, thus exerting an effect of being able to obtain a lithium ion secondary battery easily with good workability, which has excellent charge and discharge characteristics, can be made into a thin form having large energy density and is able to be formed into optional shapes.

And by using a adhesive resin solution contains 3–10 parts by weight of a fluoride resin or a mixture containing a fluoride resin as the main component in N-methylpyrrolidone, both of ion conductivity and bonding strength of the adhesive resin layer are kept more appropriately.

What is claimed is:

1. A lithium ion secondary battery comprising:
   a positive electrode having a positive electrode collector and a positive electrode active material layer formed on said positive electrode collector;
   a negative electrode having a negative electrode collector and a negative electrode active layer formed on said negative electrode collector;
   a separator which is arranged between said positive electrode and negative electrode and keeps a lithium ion-containing electrolytic solution; and
   two adhesive resin layers having through holes, wherein each layer bonds said positive electrode active material layer and said negative electrode active material layer, respectively, to said separator and keeps said electrolytic solution to mutually connect said positive electrode, separator and negative electrode electrically.

2. The lithium ion secondary battery according to claim 1 wherein said adhesive resin layers each have a ratio of total through hole space to space of said layer that is equal to or larger than that of the separator.

3. The lithium ion secondary battery according to claim 2 wherein said ratio is more than 35%.

4. The lithium ion secondary battery according to claim 1 wherein an ionic conduction resistivity of said adhesive resin layer in which the electrolytic solution is kept is equal to or lower than an ionic conduction resistivity of said separator in which the electrolytic solution is kept.

5. The lithium ion secondary battery according claim 1 wherein a bonding strength between the positive electrode active material layer and the separator is equal to or larger than a bonding strength between said positive electrode active material layer and the positive electrode collector, and a bonding strength between the negative electrode active material layer and said separator is equal to or larger than a bonding strength between said negative electrode active material layer and the negative electrode collector.

6. The lithium ion secondary battery according to claim 1 wherein each adhesive resin layer is made of a fluoride resin or a mixture which comprises a fluoride resin as the main component.

7. The lithium ion secondary battery according to claim 6 wherein the fluoride resin is polyvinylidene fluoride.

8. The lithium ion secondary battery according to claim 1 wherein each adhesive resin layer is formed from an adhesive resin solution of an adhesive resin in N-methylpyrrolidone, followed by evaporating the N-methylpyrrolidone from said adhesive resin solution to form said each adhesive resin layer.

9. The lithium ion secondary battery according to claim 8, wherein the adhesive resin is a fluoride resin or a mixture containing a fluoride resin.

10. The lithium ion secondary battery according to claim 9 wherein the fluoride resin is polyvinylidine fluoride.

* * * * *